United States Patent
Maytal (10) Patent No.: US 6,934,325 B2
(45) Date of Patent: Aug. 23, 2005

(54) MULTI-LINE DISTRIBUTED MODEM

(75) Inventor: Benjamin Maytal, Mevasseret Zion (IL)

(73) Assignee: Smart Link Ltd., Netanya (IL)

( * ) Notice: Subject to any disclaimer, the term of this patent is extended or adjusted under 35 U.S.C. 154(b) by 746 days.

(21) Appl. No.: 09/795,476

(22) Filed: Mar. 1, 2001

(65) Prior Publication Data

US 2001/0023426 A1 Sep. 20, 2001

Related U.S. Application Data

(63) Continuation of application No. 08/929,882, filed on Sep. 15, 1997, now Pat. No. 6,457,037, which is a continuation-in-part of application No. 08/775,385, filed on Dec. 30, 1996, now Pat. No. 6,092,095.

(30) Foreign Application Priority Data

Jan. 8, 1996 (IL) ................................................ 116708

(51) Int. Cl.⁷ .............................. H04L 5/16; H04B 1/38
(52) U.S. Cl. ....................................... 375/222; 455/557
(58) Field of Search ........................... 375/222; 379/94, 379/201

(56) References Cited

U.S. PATENT DOCUMENTS

| | | | |
|---|---|---|---|
| 4,736,318 A | | 4/1988 | Delyani et al. |
| 5,046,188 A | * | 9/1991 | Molnar ..................... 379/93.07 |
| 5,201,049 A | * | 4/1993 | Shorter .......................... 718/1 |
| 5,291,694 A | | 3/1994 | Baker et al. |
| 5,339,413 A | | 8/1994 | Koval et al. |
| 5,392,448 A | | 2/1995 | Frankel et al. |
| 5,423,022 A | | 6/1995 | Ackley |
| 5,535,242 A | * | 7/1996 | Brigida et al. .............. 375/222 |
| 5,541,955 A | | 7/1996 | Jacobsmeyer |
| 5,628,013 A | | 5/1997 | Anderson et al. |
| 5,668,857 A | * | 9/1997 | McHale .................... 379/93.07 |
| 5,721,922 A | | 2/1998 | Dingwall |
| 5,740,233 A | * | 4/1998 | Cave et al. ............. 379/112.06 |
| 5,892,764 A | * | 4/1999 | Riemann et al. ............ 370/401 |
| 6,044,107 A | | 3/2000 | Gatherer |
| 6,092,095 A | | 7/2000 | Maytal |

FOREIGN PATENT DOCUMENTS

| | | |
|---|---|---|
| EP | 0 820 168 | 1/1998 |
| EP | 0 889 615 | 1/1999 |
| WO | WO 99/40685 | 8/1999 |
| WO | WO 01/41418 | 6/2001 |
| WO | WO 01/58173 | 8/2001 |

OTHER PUBLICATIONS

Kalet I, et al, "The Capacity of PCM Voiceband Channels", Proceedings of the International Conference on Communications (ICC), vol. 3, May 23–26, 1993, pp. 507–511.

U.S. Appl. No. 08/929,882, filed Sep. 15, 1997, Maytal.

Core Technologies, "Pentium Secrets", Terje Mathisen, published in Byte Magazine, pp. 191–192, Jul. 1994.

* cited by examiner

*Primary Examiner*—Stephen Chin
*Assistant Examiner*—Harry Vartanian
(74) *Attorney, Agent, or Firm*—Hoffman, Wasson & Gitler, P.C.

(57) ABSTRACT

A system for executing real-time tasks, such as a multi-line modem, on a client-server network includes a control unit and multiple processing units. The control unit is implementable by the server and each processing unit is implementable by a client or by the server. For the modem, the processing units can either modulate outgoing data and demodulate incoming samples per line or can implement one stage of the modem. For the former embodiment, the control unit assigns one processing unit to each active communication between one modem application on the network and one phone line. For the latter embodiment, the control unit moves the data and samples from one stage to the next.

7 Claims, 8 Drawing Sheets

MULTI-LINE DISTRIBUTED MODEM

CROSS-REFERENCE TO RELATED APPLICATIONS

This patent application is a continuation application of U.S. patent application Ser. No. 08/929,882, filed Sep. 15, 1997 now U.S. Pat. No. 6,457,037, which is a continuation-in-part of U.S. patent application Ser. No. 08/775,385 filed Dec. 30, 1996, now U.S. Pat. No. 6,092,095, which are incorporated by reference in their entirety herein.

FIELD OF THE INVENTION

The present invention relates to host signal processing modems generally and to multi-line modems in particular.

BACKGROUND OF THE INVENTION

Modems are utilized for transferring data between a personal computer (PC) and an external computer The modem translates between characters of PC data and electrical signals which are carried on the phone lines and thus enables the PC to communicate with the external world.

A modem initiates a communication with a training session in which the two communicating modems synchronize their signals and decide on a communication format. After the training session, the application prepares packets of data to transmit and provides these to the modem. The modem, in turn, converts the packets into bits or symbols, modulates the bits, samples the signal and transmits the resultant signal. After converting the phone signal to digital samples, the receiving modem demodulates the samples to determine the data of the packet. After a packet is transmitted, the two modems have a "handshake" to ensure that the receiving modem properly received the packet. The demodulated packet is then provided to the receiving application.

A modem typically is a peripheral unit of the PC, whether located externally or internally to the box of the PC. The modem includes various interface elements which digitize the analog phone signals and a digital signal processor which performs the modulation and demodulation operations, as well as the training session and any handshake operations.

Recently, a new type of modem has appeared which performs most of the modem operations internally on the personal computer. This "native" or "host" signal processing modem includes an interface which digitizes the analog phone line data and an application on the PC which performs the modem operations. Various host signal processing modems are described in U.S. Ser. No. 08/775,385 and in U.S. Pat. No. 4,965,641 which are incorporated herein to by reference.

Figure 1:
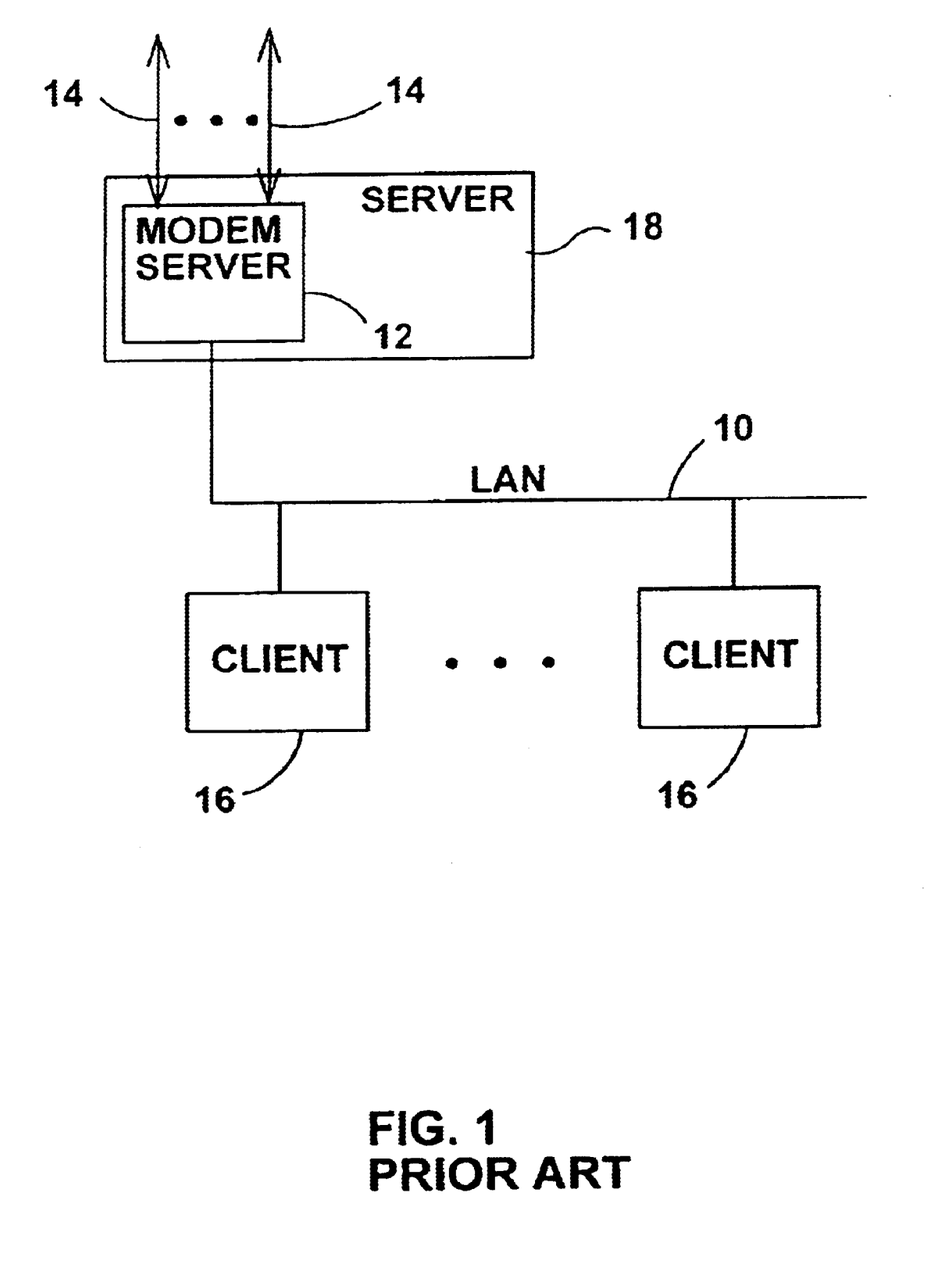
FIG. 1 is a schematic illustration of a local area network (LAN) with a prior art multi-line modem.

Small to mid-sized offices which have multiple computers, some or all of whom might want to communicate with the external world, require multiple modems. Each computer can have its own individual modem or, if the computers are connected together via a local area network (LAN) 10 as shown in FIG. 1 to which reference is now made, the computers can communicate through a multi-line modem 12.

The multi-line modem 12 typically is connected to multiple external telephone lines 14 on one end and to the LAN 10 on the other. The computers of the office are also connected to the LAN 10, as "clients" 16, and there is a "server" 18 which controls the LAN 10. The multi-line modem 12 can either be an add-on card to the server 18 or a unit separate from it. The multi-line modem 12 connects the client 16 which currently wants to communicate to the line 14 currently available and performs the modem operations for each and every client currently communicating. Such multi-line modems are also very common at web sites and Internet service providers which must provide multiple callers with access to their computers.

No multi-line modems have been produced with host signal processing because of the significant amount of processing power required to service even a single line.

SUMMARY OF THE INVENTION

An object of the present invention is to provide multi-line modem capabilities using host signal processing.

There is therefore provided, in accordance with a preferred embodiment of the present invention, a multi-line modem implemented on a client-server network, The modem includes a control unit and multiple processing units. The control unit is at least partially implementable by the server and each processing unit is implementable by a client or by the server. The processing units can either modulate outgoing data and demodulate incoming samples per line or can implement one stage of the modem, For the former embodiment, the control unit assigns one processing unit to each active communication between one modem application on the network and one phone line. For the latter embodiment, the control unit moves the data and samples from one stage to the next.

Moreover, in accordance with a preferred embodiment of the present invention, the server and clients also implement a host signal processing driver.

Further, in accordance with a preferred embodiment of the present invention, the control unit includes a hardware interface for converting between phone signals and digital samples and a distributor for distributing outgoing data and incoming samples to the relevant processing units which convert them into outgoing samples and incoming data, respectively. The distributor also distributes the outgoing samples to the hardware interface and distributes the incoming data to the relevant modem applications.

Still further, in accordance with a preferred embodiment of the present invention, the control unit includes a negotiator for performing the initial negotiation session of a modem communication.

Finally, the present invention includes a system for executing real-time tasks in a distributed manner across a network having a server and multiple clients. Like the multi-line modem, the system has a control unit and multiple processing units. The control unit is at least partially implementable by the server and each processing unit is implementable by a client or by the server. The processing units can either process one channel of data or can implement one stage of the operation. For the former embodiment, the control unit assigns one processing unit to each active channel. For the latter embodiment, the control unit moves the data from one stage to the next.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 2:
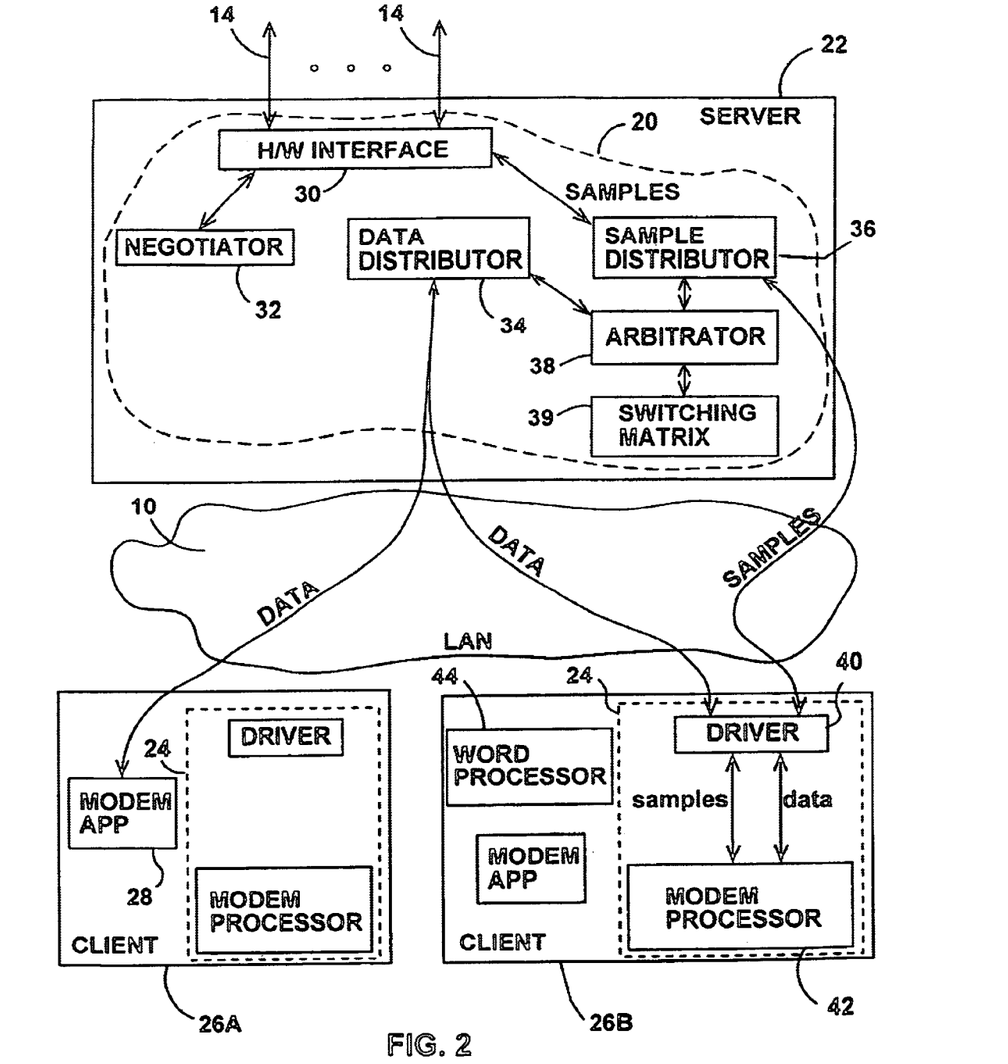
FIG. 2 is a schematic illustration of a multi-line, distributed modem, constructed and operative in accordance with a preferred embodiment of the present invention.

Reference is now made to FIG. 2 which illustrates a system for executing real-time tasks in a distributed manner over a network. In the example of FIG. 2, a multi-line distributed modem is shown. It will be appreciated that the principles of the present invention are applicable to real-time tasks other than modem processing, such as video compression and decompression and video conferencing.

The multi-line modem of the present invention is distributed among the computers connected to the LAN. In the first embodiment of FIG. 2, the control units 20 of the multi-fine modem reside in the server 22 and multiple processing units 24 of the multi-line modem reside in the multiple clients 26.

Modem applications 28, such as a terminal emulator, a web browser, or an email program, are also found on the multiple clients 26. These applications 28 request or respond to a communication with the external world which the multi-line modem of the present invention must implement.

The control unit 20 of the distributed modem controls the connection to the external world and directs the operation of the processing units 24 while each of the latter perform the modulation or demodulation of the signal on one particular line. The control unit 20 responds to the external world (dialing another modem, answering an incoming call, handling the initial training phase, etc.) for each of the multiple phone lines 14 and only activates one of the processing units 24 once modulation or demodulation of signal of a line is required. The control unit 20 also communicates with the modem applications 28, receiving data to be modulated and providing demodulated data.

It is noted that the control unit 20 and processing units 24 are not the only processes operating on the server 22 and clients 26, respectively. However, elements 20 and 24 perform real-time processes and thus, the server 22 and clients 26 run host signal processing drivers which enable multiple processes to occur, some or all of which are real-time processes. An exemplary host signal processing driver is described in U.S. Ser. No. 08/775,385, assigned to the common assignee of the present invention and incorporated hereinabove by reference. Server 22 and clients 26 are minimally computers having PENTIUM 60 MHz central processing units, as commercially available from Intel Corporation of the USA, thereby to perform host signal processing.

As shown in FIG. 2, the control unit 20 comprises a hardware interface 30, a negotiator 32, a data distributor 34, a sample distributor 36 and an arbitrator 38. The hardware interface 30 is physically connected to the phone lines 14 and converts the analog phone signals to digital samples and vice versa. The negotiator 32 controls the communication with the external modem, performing the training session at the beginning of the communication, The operations of negotiator 32 are well known in the art of modems and will not be detailed any further.

The data and sample distributors 34 and 36, respectively, operate together with the processing units 24 to process demodulated data from the modem application 28 and modulated samples from the hardware interface 30. The data distributor 34 directs outgoing data from the modem application 28 to the processing units 24 and incoming demodulated data from the processing units 24 to the modem application 28, all via the LAN 10. Similarly, the sample distributor 36 directs outgoing modulated samples from the processing units 24 to the hardware interface 30 and incoming samples from the hardware interface 30 to the processing units 24, also via the LAN 10. Sample distributor 36 also performs any handshakes necessary during the communication.

When a new communication is begun, the arbitrator 38 determines which processing unit 24 will process the communication. The resultant association of processing unit 24, modem application 28 which is communicating and phone line 14 on which the communication is transmitted is stored in a switching matrix 39 which the arbitrator 38 accesses whenever requested to do so by the distributors 34 and 36.

Each processing unit 24 comprises a driver 40 and a modem processor 42 and is operative on a single one of the multiple modem signals.

The driver 40 directs the received samples or data to the modem processor 42 for demodulation or modulation, respectively. Driver 40 also directs the processed signals (data or samples, respectively) to the relevant data or sample distributor 34 or 36, respectively.

The modem processor 42 performs the actual data modulation or sample demodulation and in this, operates as a "data pump". As is known in the art, the process involves multiple computer-intensive operations, such as equalization, echo cancellation, constellation operations, filtering and carrier modulation or demodulation. The details of the modulation or demodulation operations will not be described herein since they are very well known in the art. For example, the book, *The Theory and Practice of Modem Design,* by John Bingham, describes the operations which a modem task performs and is incorporated herein by reference.

Since client 26, of which modem processor 42 is a part, operates a host signal processing driver, these modem operations are carried out in real-time by the client 26 while other, non-real-time applications also occur. Thus, the user of client 26 generally will not notice that client 26 has been appropriated for processing a modem communication.

In the example of FIG. 2, the user of client 26B is working on a word processor 44. At the same time, the processing unit 24 of client 26B is actively processing a modem communication for the modem application 28 of client 26A. Modem processor 42 provides the results back to driver 40 which directs the demodulated data to data distributor 34 or the modulated samples to the sample distributor 36 for transmission, via hardware interface 30, to the external modem.

As shown in FIG. 2, one processing unit 24 exists on each client 26. However, the number of active processing units 24 is equal to the number of currently active modem communications. When a new communication begins, negotiator 32 performs the initial negotiation, after which, arbitrator 38 selects the processing unit 24 which will process the rest of the communication. The choice can be performed in any of a number of ways. There can be a fixed roster indicating the order for selecting the next client 26 whose processing unit 24 is to be utilized. Alternatively, arbitrator 38 can maintain a short history of the activity of each of the clients 26 and can select the currently least busy client 26 as the next client to utilize. The activity history is typically the number of minutes each client is active on the LAN 10 during a predetermined period of time.

Figure 3:
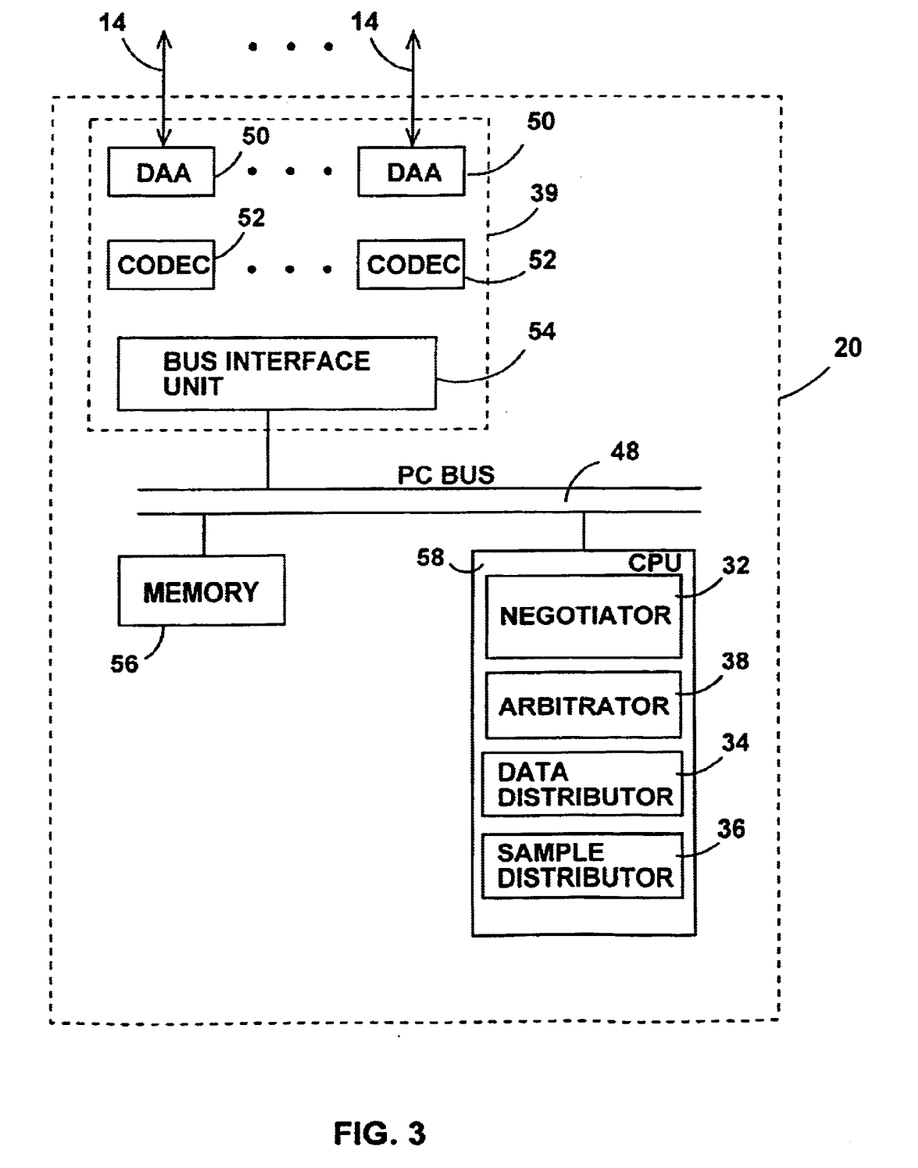
FIG. 3 is a schematic illustration detailing the elements of the multi-line, distributed modem of FIG. 2 which are found on the server.

Reference is now made to FIG. 3 which details the control unit 20 of the multi-line modem of the present invention. FIG. 3 also indicates the configuration of the elements within a personal computer.

The hardware interface 30 is typically an add-on hardware board to the PC which is connected to the PC bus 48 of the PC. The hardware interface 34 typically comprises a data access arrangement (DAA) unit 50 and a codec 52 per phone line 14, and one bus interface unit 54. The DAAs 50 and codecs 52 are standard telephony hardware elements. The DAAs 50 provide line protection and the codecs 52 convert between the analog telephone line signals and digital samples. The multiple codecs 52 are connected to the bus interface unit 54 which passes the digital samples to and from the PC bus 48.

Also connected to the PC bus 48 is a storage element 56 and a central processing unit (CPU) 58. Storage element 56 stores the digital samples to be processed or to be transmitted and the switching matrix 39. CPU 58 implements the negotiator 32, the arbitrator 38 and the distributors 34 and 36. As mentioned hereinabove, CPU 58 operates a host signal processing driver under which negotiator 32, arbitrator 38 and distributors 34 and 36 are different processes. Thus, while negotiator 32 converses with external modems, arbitrator 38 and distributors 34 and 36 control the modem processing operations of the currently active modem processors 42.

Figure 4A:
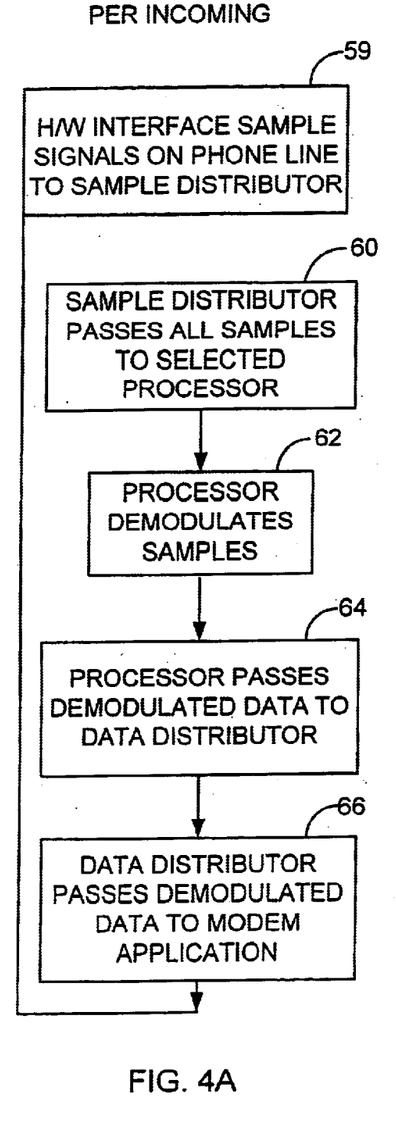
FIGS. 4A and 4B are flow chart illustrations of the modem processing operations of the multi-fine modem of FIG. 2 when handling incoming and outgoing packets, respectively.
Figure 4B:
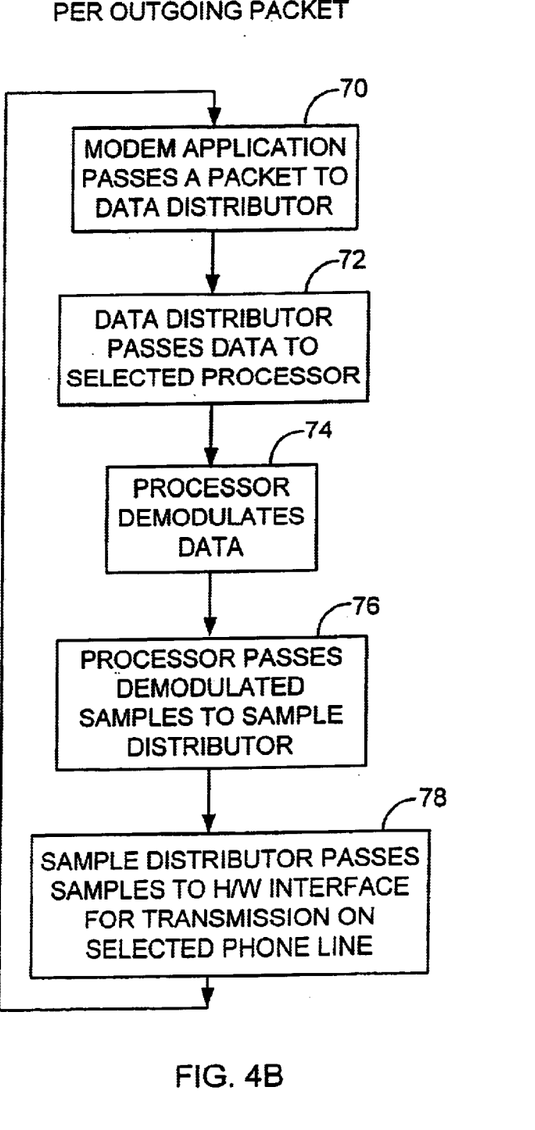

Reference is now made to FIGS. 4A and 4B which illustrate the method of processing a single modem communication.

For each incoming set of samples (FIG. 4A), which typically are the samples related to a data packet, the hardware interface 30 samples, in step 59, the signal on the relevant phone line 14. Hardware interface 30 then passes the samples to the sample distributor 36. The sample distributor 36 then passes, in step 60, all samples of the set to the selected processor 42 which, in turn, demodulates them (step 62). The processor 42 then passes the demodulated data packet to the data distributor 34 (step 64) which, in turn, passes the demodulated data to the relevant modem application 28 (step 66). The process is repeated until the session is terminated.

It will be appreciated that the distributors 34 and 36 access switching matrix 39, via arbitrator 38, in order to distribute the samples and data to the relevant one of the phone line 14, modem application 28 or client 26 associated with the communication For outgoing packets (FIG. 4B), the modem application 28 passes (step 70) its packet of data to data distributor 34 which, in turn, passes (step 72) the data to the associated processor 42. Once the processor 42 has modulated the data (step 74), it passes the modulated samples to the sample distributor 36 (step 76) which, in turn, passes (step 78) the modulated samples to the hardware interface 34 for transmission on the associated phone line 14.

Figure 5:
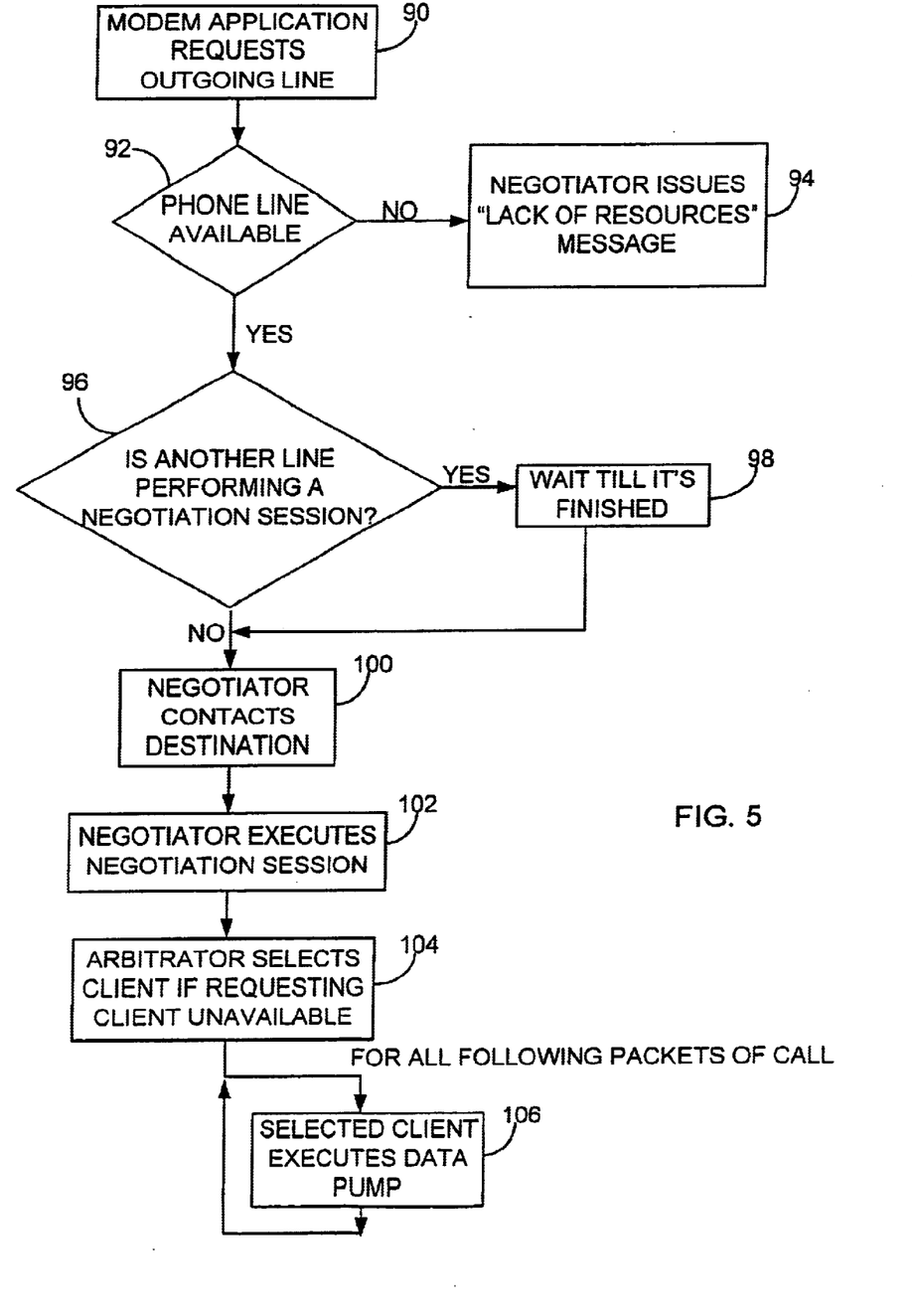
FIG. 5 is a flow chart illustration of the operations of the multi-line modem of FIG. 2 when handling outgoing calls.
Figure 6:
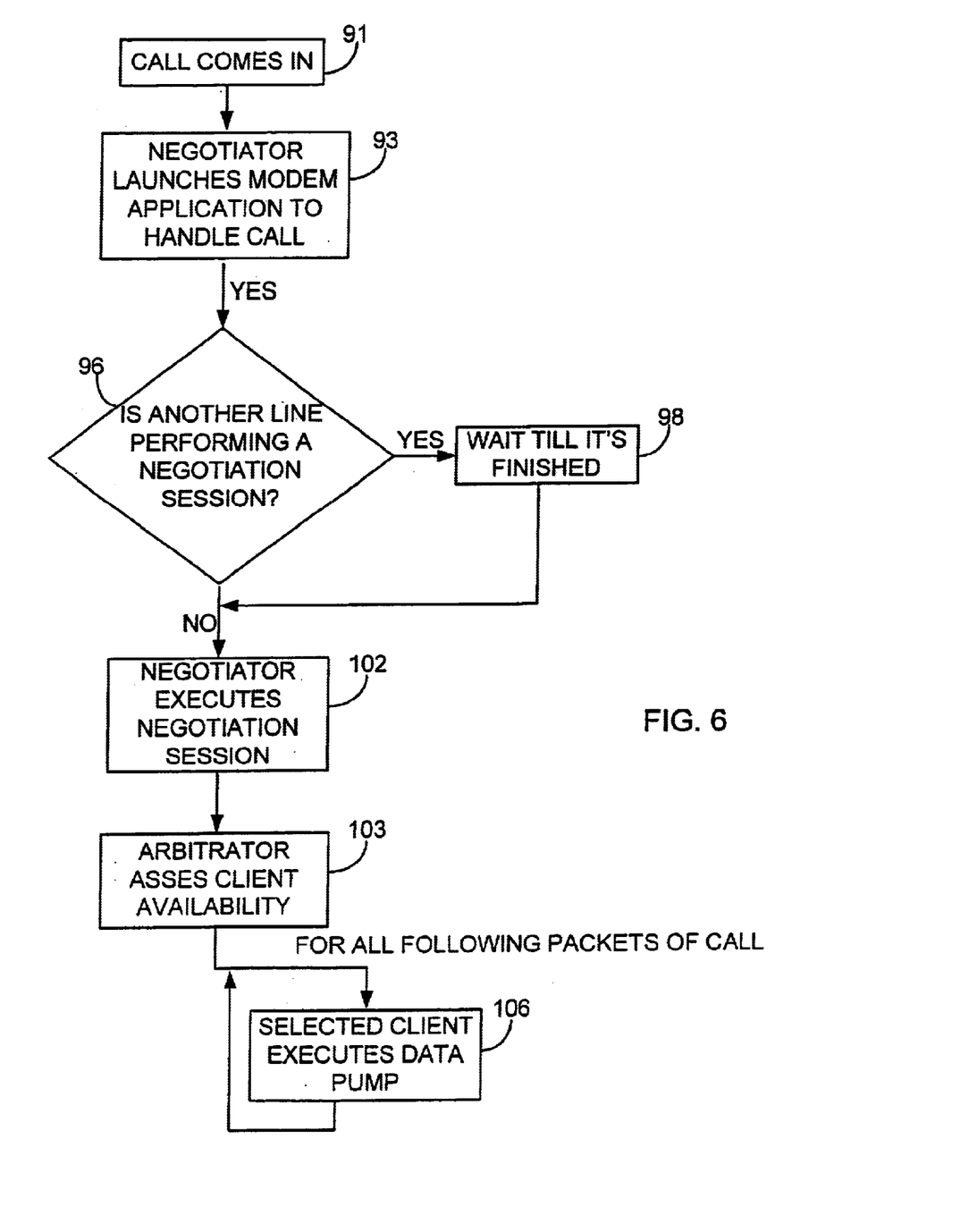
FIG. 6 is a flow chart illustration of the operations of the multi-line modem of FIG. 2 when handling incoming calls.

Reference is now made to FIGS. 5 and 6 which illustrate the operations of the multi-line modem of the present invention for outgoing and incoming calls, respectively.

Outgoing calls (FIG. 5) begin with a request from a modem application 28 for an outgoing phone line (step 90). If negotiator 32 determines (step 92) that no phone line is available, negotiator 32 issues (step 94) a "lack of resources" message indicating to modem application 28 to try again later. Otherwise, negotiator 32 determines (step 96) if it is performing a negotiation session on another line. If so, modem application 28 has to wait (step 98) until negotiator 32 finishes the previous negotiation session.

Otherwise, negotiator 32 contacts (step 100) the destination modem and then executes (step 102) the negotiation session with the destination modem. Once the negotiation session is finished, arbitrator 38 selects (step 104) the client to process the communication. Typically, this will be the client 26 whose modem application 28 requested the outgoing line. However, it is possible that the requesting client is already processing a communication, in which case, the arbitrator 38 must select a different client to process the communication. The selection process is the same or similar to the one discussed hereinabove. When the selection is finished, arbitrator 38 stores an identification of the selected client 26, the phone line 14 carrying the communication and the modem application 28 receiving the communication in the switching matrix 39.

Finally, for all packets of the communication, the selected client 26 executes (step 106) the data pump, described hereinabove with respect to FIGS. 4A and 4B, in conjunction with the distributors 34 and 36.

When a new call comes in (step 91 of FIG. 6), negotiator 32 first responds to the telephone ring and then launches a modem application 2B (step 93), either on the server 22 or on one of the clients 26, which will handle the new communication. As for outgoing calls, negotiator 32 then determines (step 96) if it is performing a negotiation session on another line. If so, modem application 28 has to wait (step 98) until negotiator 32 finishes the previous negotiation session. Otherwise, negotiator 32 performs the negotiation.

Before the negotiation is successfully finished, arbitrator 38 assesses (step 103) the availability, as described hereinabove, of the clients 26 which are not already processing modem communications. The arbitrator 38 activates the selected client 26, stores the identification information for the communication, and then begins processing the communication itself. This involves executing (step 106) the data pump, described hereinabove in FIGS. 4A and 4B, with the selected client 26 for each packet (incoming or outgoing) associated with the communication.

Figure 7:
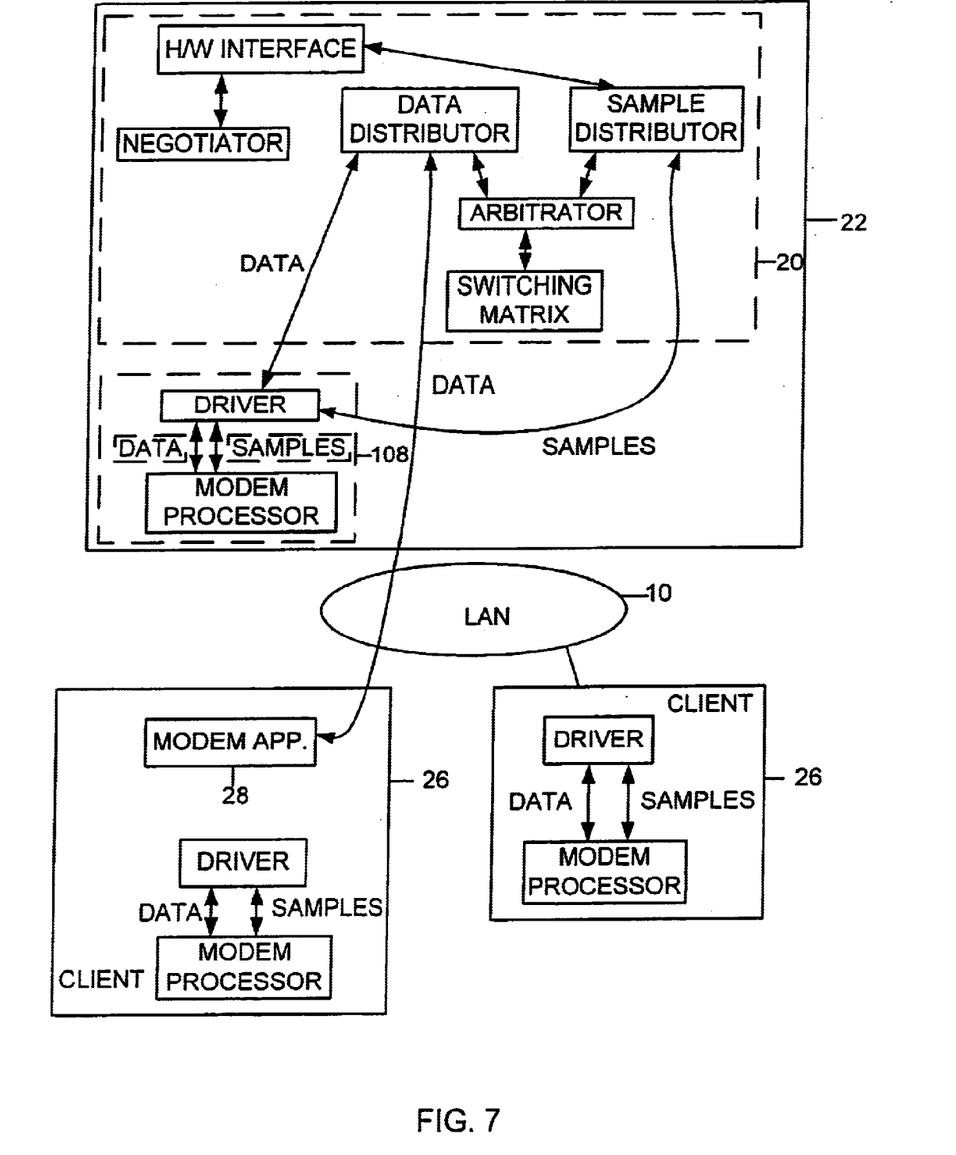
FIG. 7 is a block diagram illustration of an alternative embodiment of the multi-line distributed modem of the present invention.

Reference is now briefly made to FIG. 7 which illustrates an alternative embodiment of the present invention in which there are one or more processing units, labeled 108, on the server 22, in addition to or instead of the processing units 24 on the clients 26. Processing units 108 operate the same as processing units 24.

The operation of the embodiment of FIG. 7 is the same as described hereinabove for the embodiment of processing units 24 only on clients 26, however, in this embodiment the server 22 also implements a processing unit 108. This embodiment requires that server 22 have significant computer processing power, such as is available in a PENTIUM 133 MHz computer, in order to run the multiple real-time processes of the control unit 20 and the processing unit or units 108.

Figure 8:
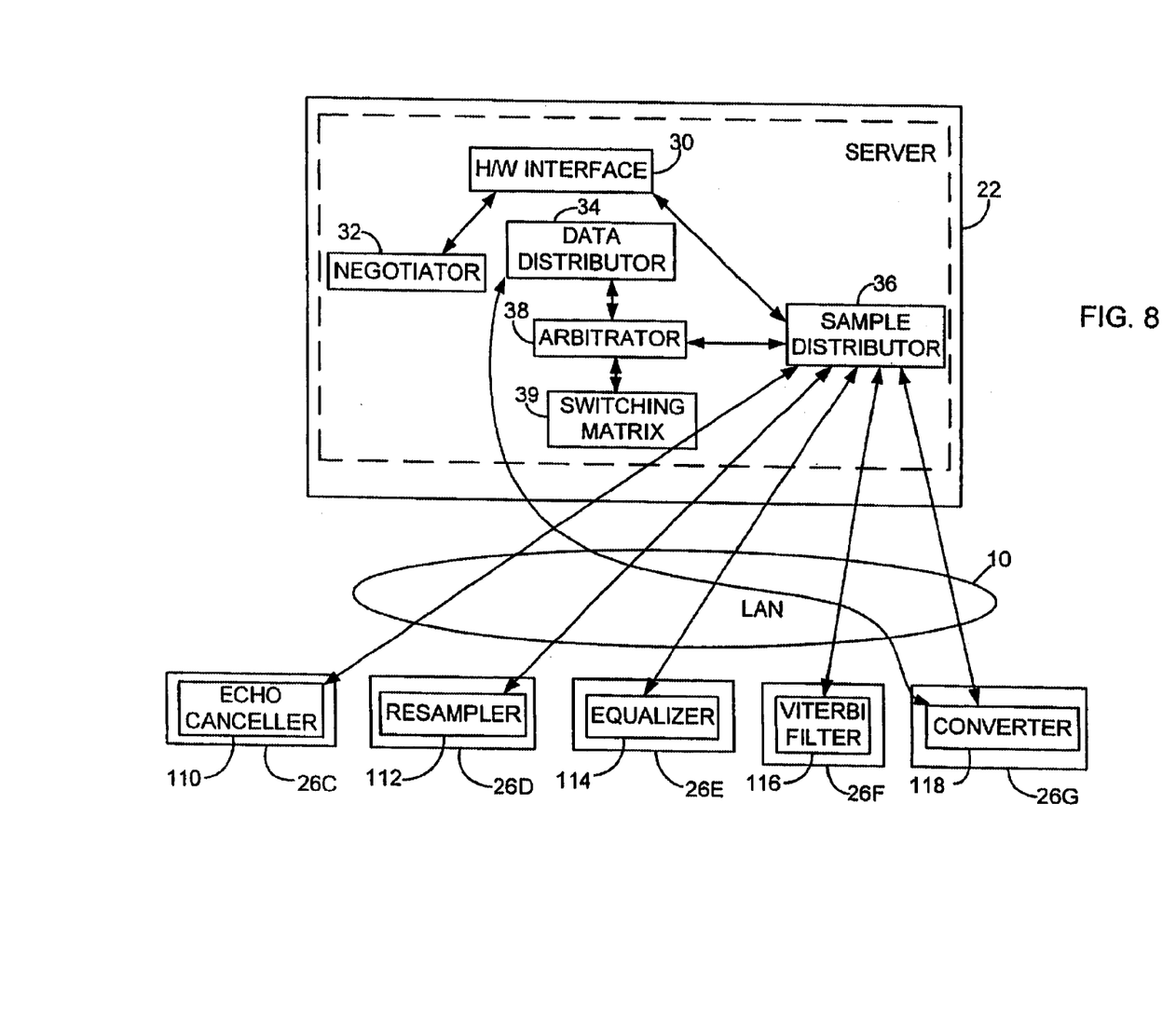
FIG. 8 is a block diagram illustration of a further alternative embodiment of the multi-line distributed modem of the present invention.

Reference is now made to FIG. 8 which illustrates a further alternative embodiment of the present invention in which the modem processing is spread over multiple clients, each responsible for one portion of the processing operation. It will be appreciated that the modem of FIG. 8 is useful as a multi-line modem, operating with multiple phone lines, or as a single line modem.

FIG. 8 shows an example where the modem operation is divided into five operations, as follows: echo cancellation, resampling, equalization, Viterbi filtering and data-to-sample conversion. According to this second embodiment, each client 26 is responsible for only one of the modem suboperations. Thus, as shown in FIG. 8, client 26C implements an echo canceller 110, client 26D implements a resampler 112, client 26E implements an equalizer 114, client 26F implements a Viterbi filter 116 and client 26G implements a data-to-sample converter 118. Echo canceller 110, resampler 112, equalizer 114 and Viterbi filter 116 communicate only with the sample distributor 36. Converter 118 converts between data and samples and thus, communicates with both distributors 34 and 36.

The five processors 110–118, spread among the five clients 26C–26G, together form the modem processor of the previous embodiments. Thus, each processor 110–118 operates on all of the currently active communication channels. Each packet passes through all five processors 110–118 with an indication of the channel to which it belongs.

It will be appreciated that any type of real-time task can be performed in a distributed manner as shown hereinabove, either by assigning one processing unit per task or by assigning one processing unit per stage of a task. In the latter embodiment each processing unit performs its operation for all active tasks.

It will further be appreciated by persons skilled in the art that the present invention is not limited by what has been particularly shown and described herein above. Rather the scope of the invention is defined by the claims that follow.

What is claimed is:

1. A multi-line modem for a network having a multiplicity of computers, one of which acts as a server and the remainder of which act as clients, the modem having at least one phone line connected thereto, the modem comprising:

a control unit connected to said at least one phone line and partially implementable on said server, which communicates with modem applications on said network, and multiple processing units, each one implementable on one computer, for performing one stage in modulating outgoing data from one of said modem applications and in demodulating incoming samples from said at least one phone line, wherein said control unit directs data and samples to each processing unit in the appropriate order.

2. A modem according to claim 1 and wherein said control unit includes: a hardware interface for converting between phone signals and digital samples; and a distributor for distributing outgoing data and incoming samples in the appropriate order to the relevant processing units which together convert them into outgoing samples and incoming data, respectively, for distributing said outgoing samples to said hardware interface and for distributing said incoming data to the to relevant modem applications.

3. A modem according to claim 2 and wherein said control unit includes a negotiator for performing the initial negotiation session of a modem communication.

4. A modem according to claim 1 wherein said client and server include host signal processing drivers.

5. A method for processing multiple modem communications on a client-server network having multiple phone lines and a multiplicity of computers, one of which acts as a server and the remainder of which act as clients, the method comprising the steps of:

when a new modem communication begins, selecting a computer for processing the modem communication and associating said selected computer with the phone line and modem application associated with the new modem communication; and distributing outgoing data and incoming samples from the server to the selected computer which converts them into outgoing samples and incoming data, respectively;

distributing said outgoing samples to a hardware interface connected to the phone line associated with said modem communication; and distributing said incoming data to said modem application associated with the modem communication.

6. A method according to claim 5 and including the step of to performing the initial negotiation prior to said step of selecting a computer.

7. A system for executing real-time tasks in a distributed manner across a network having a multiplicity of computers, one of which acts as a server and the remainder act as clients, the system having at least one channel connected thereto, the system comprising:

a control unit connected to said at least one channel and partially implementable on said server, which communicates with real-time applications on said network; and multiple processing units, each one implementable on one computer, for processing the output of one channel in real-time;

wherein said control unit assigns one processing unit to process the output of one channel for one real-time application.

* * * * *